(12) United States Patent
Cho

(10) Patent No.: US 6,702,309 B2
(45) Date of Patent: Mar. 9, 2004

(54) REAR SUSPENSION FOR VEHICLES

(75) Inventor: Sun-Hyung Cho, Ulsan-Shi (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 10/087,394

(22) Filed: Mar. 1, 2002

(65) Prior Publication Data

US 2002/0167148 A1 Nov. 14, 2002

(30) Foreign Application Priority Data

May 11, 2001 (KR) .......................... 2001-25795

(51) Int. Cl.$^7$ .............................................. B60G 11/20
(52) U.S. Cl. ............................ 280/124.166; 280/781; 280/124.175
(58) Field of Search .................... 280/124.166, 781, 280/124.175, FOR 124, FOR 178, FOR 180; 180/311, 313

(56) References Cited

U.S. PATENT DOCUMENTS

| | | |
|---|---|---|
| 3,704,029 A | 11/1972 | Bailleux |
| 4,531,761 A | 7/1985 | von Sivers |
| 4,632,211 A | 12/1986 | Le Salver et al. |
| 4,817,973 A | 4/1989 | Takeda |
| 4,863,214 A | 9/1989 | Kranis, Jr. |
| 5,090,502 A | 2/1992 | Inoue et al. |
| 5,116,075 A | 5/1992 | Pierce |
| 5,183,286 A * | 2/1993 | Ayabe |
| 5,203,585 A | 4/1993 | Pierce |
| 5,385,369 A | 1/1995 | Mukai et al. |
| 5,669,728 A | 9/1997 | Koba |
| 5,862,877 A | 1/1999 | Horton et al. |
| 5,887,843 A | 3/1999 | Hidekawa et al. |
| 5,899,498 A | 5/1999 | Horton |
| 6,349,953 B1 * | 2/2002 | Yoshihira et al. |

FOREIGN PATENT DOCUMENTS

DE          3641505       *   6/1987   ........ 280/FOR 178

* cited by examiner

*Primary Examiner*—Eric Culbreth
(74) *Attorney, Agent, or Firm*—Morgan Lewis & Bockius LLP

(57) ABSTRACT

A rear suspension for vehicles is disclosed. This rear suspension has a rear floor side member, a trailing arm bracket connected to a torsion beam axle, and a locking unit mounting the trailing arm bracket to the rear floor side member while leaving a space between the trailing arm bracket and the rear floor side member. The locking unit has a pipe nut mounting the trailing arm bracket to the rear floor side member while leaving the space between the rear floor side member and the trailing arm bracket. This pipe nut uniformly distributes load applied from the torsion beam axle to the rear suspension, and so the rear suspension has an improved durability.

9 Claims, 4 Drawing Sheets

REAR SUSPENSION FOR VEHICLES

FIELD OF THE INVENTION

The present invention relates, in general, to rear suspensions for vehicles and, more particularly, to a rear suspension for vehicles designed to distribute load applied to the junction of a trailing arm bracket and a rear floor side member, thus preventing the junction from cracking.

BACKGROUND OF THE INVENTION

As well known to those skilled in the art, a suspension system for vehicles absorbs vibration and impact transmitted from the wheels to the chassis during a movement of a vehicle, thus preventing damage to the chassis and freight caused by the vibration and impact, in addition to allowing passengers to feel comfortable. The suspension system includes a front suspension and a rear suspension.

FIG. 1 shows a conventional rear suspension using a torsion beam axle. As shown in the drawing, the conventional rear suspension comprises a trailing arm bracket 100, which is assembled with a torsion beam axle and is mounted to a rear floor side member 104 through a trailing arm mounting bracket 102 (FIG. 2).

That is, the conventional rear suspension uses both the trailing arm bracket 100 and the trailing arm mounting bracket 102 for assembling the torsion beam axle to the rear floor side member 104.

The structure for assembling the torsion beam axle to the rear floor side member 104 in the rear suspension is shown in detail in the sectional view of FIG. 2. As shown in FIG. 2, a part of the rear floor side member 104 is closely interposed between the trailing arm bracket 100 and the trailing arm mounting bracket 102. A plurality of bolts 108, penetrating the trailing arm bracket 100 and the rear floor side member 104, are tightened to nuts 106 welded to the trailing arm mounting bracket 102. In the drawings, the reference numerals 110 and 112 denote a rear floor panel and a side seal inner panel, respectively.

However, in accordance with tests, such as a rough road test, it was noted that the conventional rear suspension having the above-mentioned structure has an inferior structural strength, and so it is reduced in its durability. That is, the conventional rear suspension may easily crack at the junction of the trailing arm bracket 100, the trailing arm mounting bracket 102 and the rear floor side member 104.

SUMMARY OF THE INVENTION

The present invention provides a rear suspension for vehicles, which is improved in the structure of connecting the torsion beam axle to the rear floor side member, thus having an improved structural strength accomplishing desired durability.

In a preferred embodiment, the present invention provides a rear suspension for vehicles, comprising: a rear floor side member; a trailing arm bracket connected to a torsion beam axle; and a locking unit mounting the trailing arm bracket to the rear floor side member while leaving a space between the trailing arm bracket and the rear floor side member.

In an alternative preferred embodiment, the present invention comprises a rear suspension for vehicles wherein the suspension is secured to a floor member of the vehicle. The suspension itself comprises a trailing arm bracket for connection to a torsion beam axle and a trailing arm mounting bracket supporting the trailing arm bracket. The mounting bracket is configured and dimensioned to be secured to the floor member and to define a space between the floor member and the trailing arm bracket. A spacer member is fixed to the mounting bracket and configured and dimensioned to extend through the space and also through a hole defined by the floor member and to be fixed to the floor member. Fastening means are provided to secure the trailing arm bracket to the mounting bracket. Fastening means may be bolts cooperating with the spacers, formed as pipe nuts, or other forms such as screws, rivets or a folded metal connection. In a preferred embodiment, the trailing arm mounting bracket defines a bent portion configured to define a lip that bears against the floor member to define the space.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
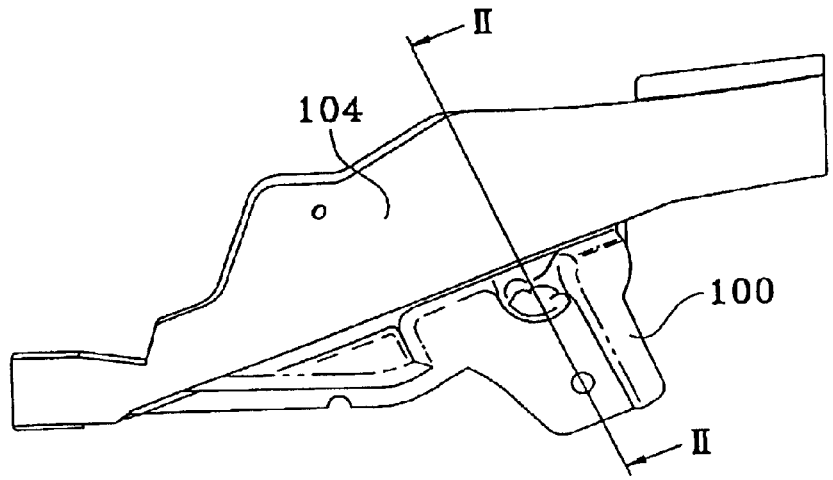
FIG. 1 is a schematic side view of a conventional rear suspension for vehicles.
Figure 2:
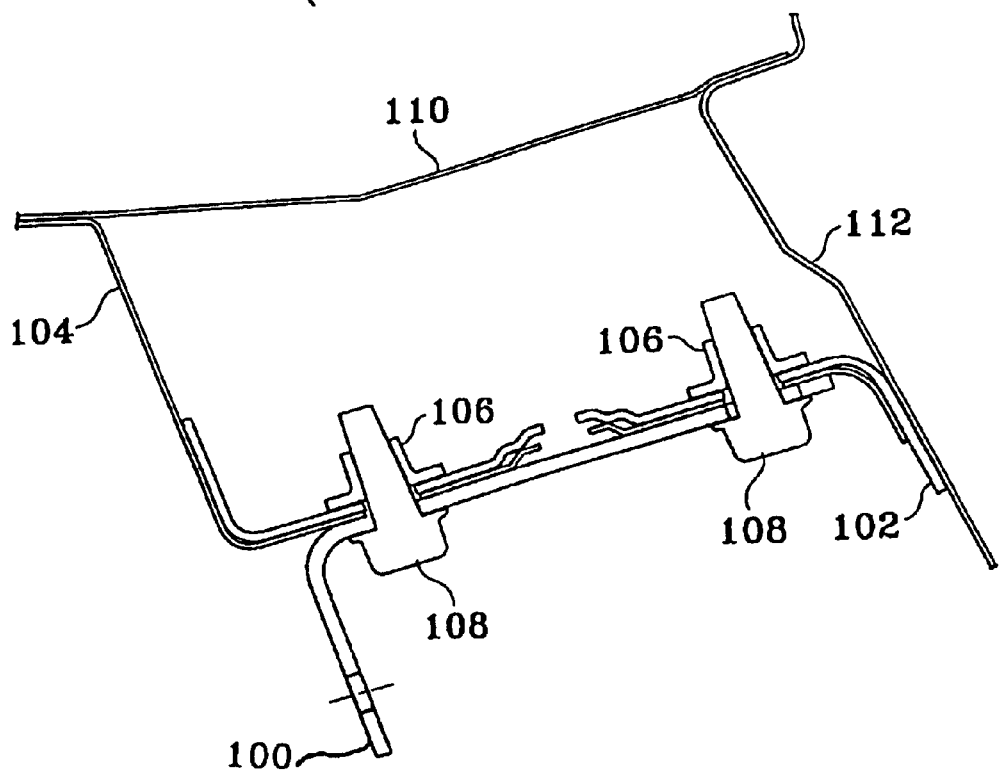
FIG. 2 is a sectional view of the conventional rear suspension taken along the line II—II of FIG. 1.
Figure 3:
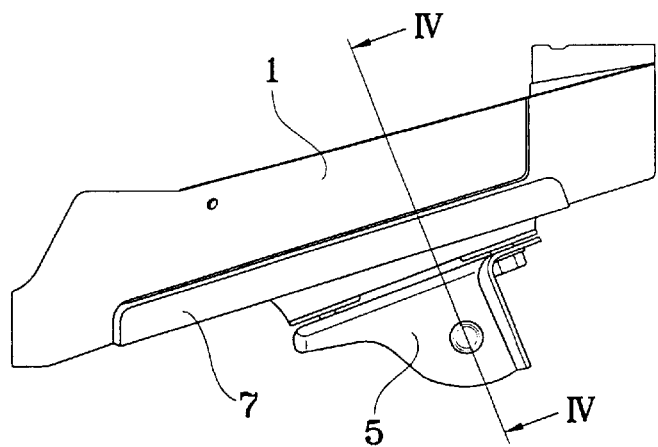
FIG. 3 is a schematic side view of a rear suspension for vehicles in accordance with a preferred embodiment of the present invention.

Reference now should be made to the drawings, in which the same reference numerals are used throughout the different drawings to designate the same or similar components.

Figure 4:
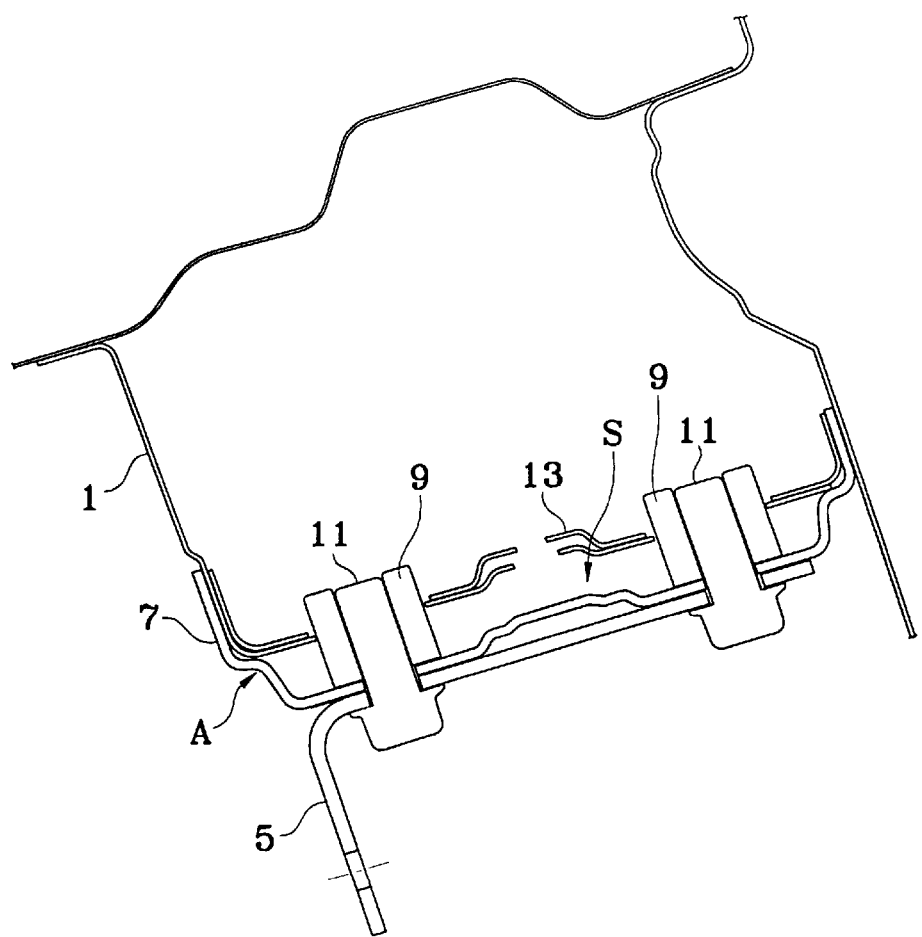
FIG. 4 is a sectional view of the rear suspension taken along the line IV—IV of FIG. 3.
Figure 5:
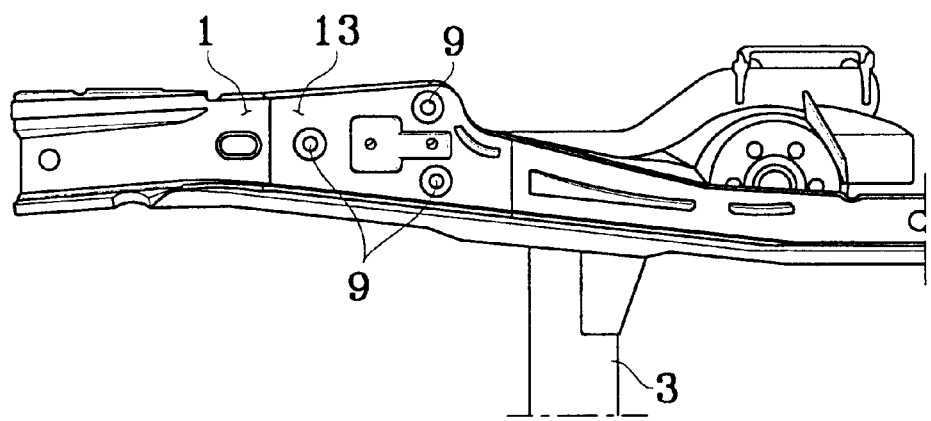
FIGS. 5 and 6 are a plan view and a side view of a rear suspension of an embodiment of the invention, with a torsion beam axle assembled with a rear suspension.
Figure 6:
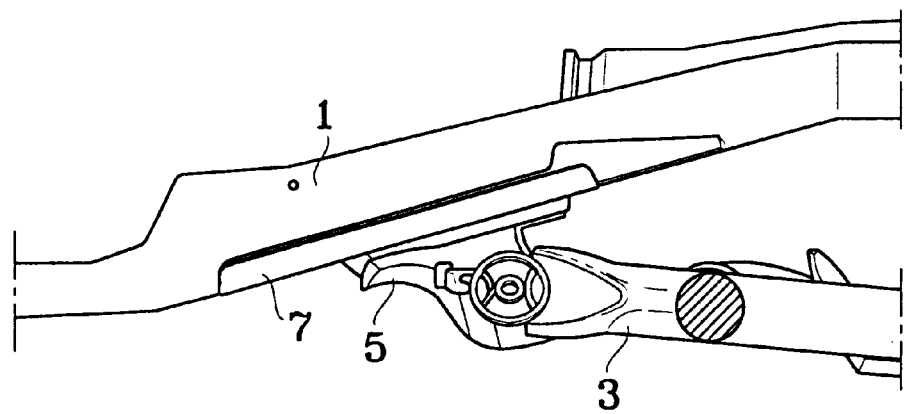
Figure 7:
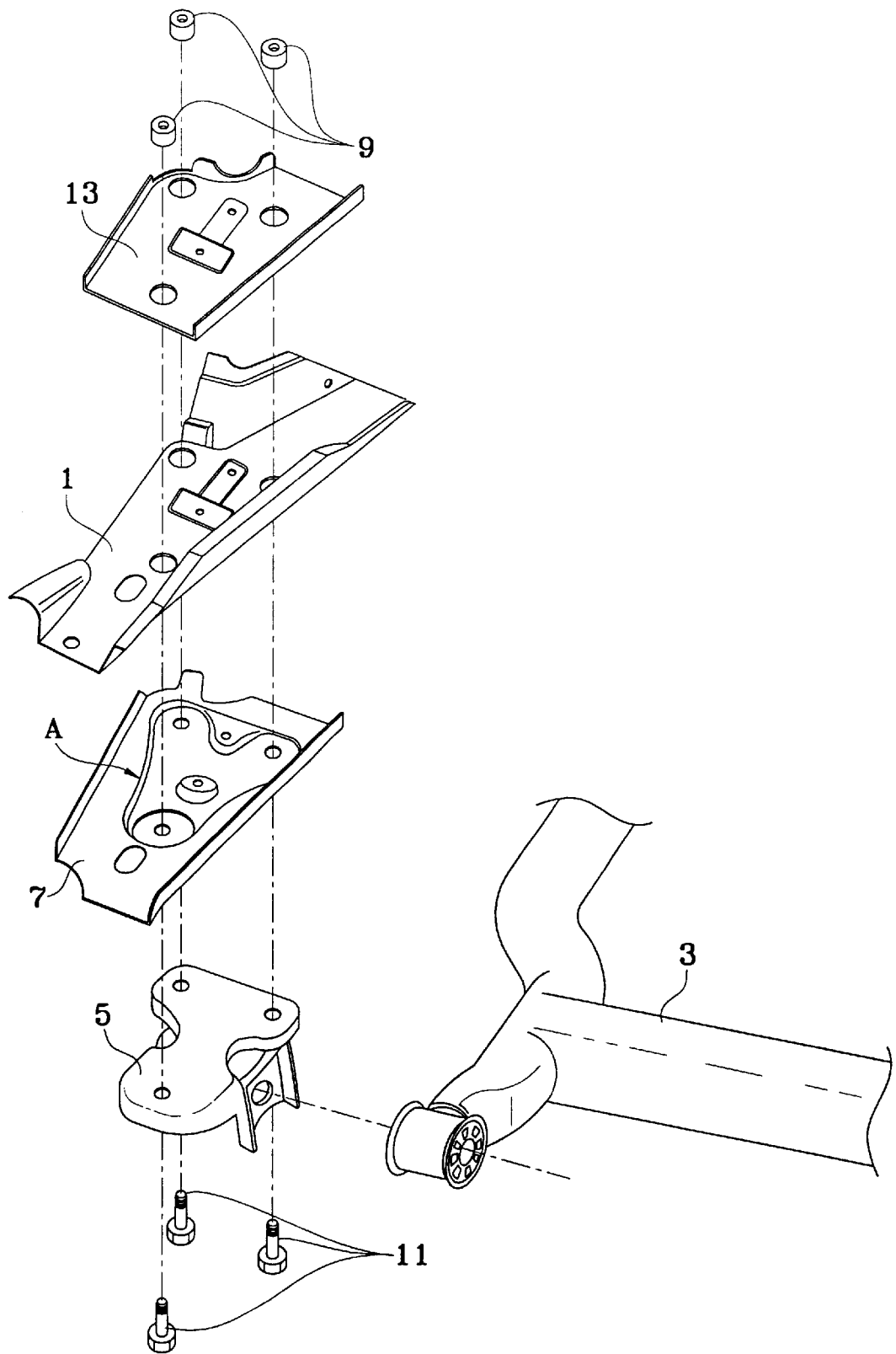
FIG. 7 is an exploded perspective view of the rear suspension of an embodiment of the invention, disassembled from the torsion beam axle.

In the rear suspension of this invention, the torsion beam axle 3 (FIGS. 5 and 6) is connected to the rear floor side member 1 through the trailing arm bracket 5. A locking unit connects the trailing arm bracket 5 to the rear floor side member 1 while leaving a space "S" between the rear floor side member 1 and the trailing arm bracket 5, as shown in FIG. 4.

The locking unit comprises a trailing arm mounting bracket 7, a plurality of pipe nuts 9 and a plurality of locking bolts 11. The trailing arm mounting bracket 7 comes at its lower surface into surface contact with the trailing arm bracket 5, and has a bent portion "A", which defines the space "S" between the trailing arm mounting bracket 7 and the rear floor side member 1. Each of the pipe nuts 9 has a tubular shape, and is welded at its lower end to the trailing arm mounting bracket 7. Each pipe nut 9 also penetrates the rear floor side member 1, and is welded to the side member 1 along its circumferential surface. The locking bolts 11 are threaded into the pipe nuts 9 upward in a direction from the trailing arm bracket 5 to the rear floor side member 1.

That is, the space "S" is defined and maintained between the rear floor side member 1 and the trailing arm bracket 5 by the locking unit consisting of the trailing arm mounting bracket 7, the pipe nuts 9 and the locking bolts 11.

In the rear suspension of this invention, the pipe nuts 9 are welded at their lower end surfaces to the trailing arm mounting bracket 7, and are also welded along their circumferential surfaces to the rear floor side member 1. Since the pipe nuts 9 are welded to both the trailing arm mounting bracket 7 and the rear floor side member 1 at several positions as described above, the rear suspension has an improved structural strength at junctions of the pipe nuts 9, the trailing arm mounting bracket 7 and the rear floor side member 1. In addition, due to the welded junctions, the rear suspension more effectively distributes load applied from the torsion beam axle 3.

A reinforcing plate 13 is added to the rear floor side member 1 at an area where the rear floor side member 1 is assembled with the trailing arm bracket 5. In such a case, the reinforcing plate 13 is welded to the rear floor side member 1, and reinforces the junction area of the rear floor side member 1 and the pipe nuts 9.

When assembling the rear floor side member 1 with the trailing arm bracket 5 of this rear suspension, the rear floor side member 1 does not come into direct surface contact with the trailing arm bracket 5, but is locked to the trailing arm bracket 5 while leaving a space "S" between them using the locking unit consisting of a plurality of members. Due to the members of the locking unit maintaining the space "S" between the rear floor side member 1 and the trailing arm bracket 5, load applied from the torsion beam axle 3 to the rear suspension is uniformly distributed, and so the rear suspension has an improved durability.

The pipe nuts 9 are welded at their lower portions to the trailing arm mounting bracket 7 and at their upper portions to the rear floor side member 1, thus firmly maintaining the space "S" formed between the rear floor side member 1 and the trailing arm bracket 5. Since load from the torsion beam axle 3 to the rear suspension is thus uniformly distributed by such pipe nuts 9 welded at several portions, the rear suspension does not easily crack at the welded junctions, different from a conventional rear suspension having a welded nut, which is welded at one position and easily cracks at a welded junction which is a stress concentration point.

As described above, the present invention provides a rear suspension for vehicles, which is improved in the structure of connecting the torsion beam axle to the rear floor side member. That is, a pipe nut 9 mounts the trailing arm bracket 5 to the rear floor side member 1 while leaving a space "S" between the rear floor side member 1 and the trailing arm bracket 5. The pipe nut 9 uniformly distributes load applied from the torsion beam axle 3 to the rear suspension, and so the rear suspension has an improved durability.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rear suspension for vehicles, comprising:
    a rear floor side member;
    a trailing arm bracket connected to a torsion beam axle; and
    a locking unit mounting the trailing arm bracket to the rear floor side member to define a space between the trailing arm bracket and the rear floor side member;
    wherein said locking unit comprises:
        a trailing arm mounting bracket supporting said trailing arm bracket, and having a bent portion defining said space between the trailing arm mounting bracket and the rear floor side member;
        a pipe nut having a tubular shape and welded at a lower end thereof to said trailing arm mounting bracket, said pipe nut also penetrating said rear floor side member and welded along a circumferential surface thereof to said rear floor side member; and
        a locking bolt threaded into said pipe nut from said trailing arm bracket to said rear floor side member.

2. The rear suspension according to claim 1, further comprising a reinforcing plate added to said rear floor side member at an area where the rear floor side member is assembled with the trailing arm bracket.

3. A rear suspension for vehicles wherein the suspension is secured to a floor member of the vehicle, said suspension comprising:
    a trailing arm bracket for connection to a torsion beam axle;
    a trailing arm mounting bracket supporting the trailing arm bracket, said mounting bracket configured and dimensioned to be secured to the floor member and to define a space between the floor member and the trailing arm bracket;
    a spacer member fixed to said to said mounting bracket and configured and dimensioned to extend through said space and a hole defined by the floor member and to be fixed to said floor member; and
    fastening means to secure the trailing arm bracket to said mounting bracket;
    wherein said trailing arm mounting bracket defines a bent portion configured to define a lip that bears against the floor member to define said space.

4. The suspension of claim 3, wherein said spacer is a pipe nut welded to the trailing arm mounting bracket.

5. The suspension of claim 4, wherein said fastening means is a bolt received in said nut.

6. The suspension of claim 3, wherein the fastening means comprise rivets.

7. The suspension of claim 3, wherein the fastening means comprise threaded fasteners.

8. The suspension of claim 3, wherein the spacer member is configured for welding to the floor member.

9. The suspension of claim 8, wherein the floor member is a rear side floor member.

* * * * *